(12) United States Patent
Roesch et al.

(10) Patent No.: US 9,223,810 B2
(45) Date of Patent: Dec. 29, 2015

(54) STORAGE ADVISOR FOR HYBRID-STORE DATABASES

(75) Inventors: Philipp Roesch, Dresden (DE); Lars Dannecker, Dresden (DE)

(73) Assignee: SAP SE, Walldorf (DE)

(*) Notice: Subject to any disclaimer, the term of this patent is extended or adjusted under 35 U.S.C. 154(b) by 100 days.

(21) Appl. No.: 13/544,185

(22) Filed: Jul. 9, 2012

(65) Prior Publication Data

US 2014/0012881 A1    Jan. 9, 2014

(51) Int. Cl.
*G06F 17/30* (2006.01)

(52) U.S. Cl.
CPC .... *G06F 17/30306* (2013.01); *G06F 17/30312* (2013.01)

(58) Field of Classification Search
CPC ............. G06F 17/30985; G06F 17/30283; G06F 17/30442; G06F 17/30289; G06F 17/30286; G06F 17/30067; G06F 17/30306; G06F 17/30312
USPC .................................................. 707/792, 769
See application file for complete search history.

(56) References Cited

U.S. PATENT DOCUMENTS

| | | | |
|---|---|---|---|
| 2006/0036989 A1* | 2/2006 | Chaudhuri et al. | 717/101 |
| 2012/0109936 A1* | 5/2012 | Zhang et al. | 707/713 |
| 2013/0226959 A1* | 8/2013 | Dittrich et al. | 707/769 |
| 2013/0232176 A1* | 9/2013 | Plattner et al. | 707/803 |

OTHER PUBLICATIONS

Philipp Roesch et al., "A Storage Advisor for Hybrid-Store Databases," Proceedings of the Very Large Data Bases Endowment, vol. 5, No. 12, Aug. 2012, pp. 1748-1758.

Richard Winter, "Scaling the Data Warehouse," InformationWeek, Oct. 11, 2008, retrieved from http://www.intelligententerprise.com/showArticle.jhtml?articleID=211100262, 5 pages.

Sanjay Agrawal et al., "Automated Selection of Materialized Views and Indexes in SQL Databases," Proceedings of the 26th International Conference on Very Large Data Bases, VLDB 2000, Sep. 2000, pp. 496-505.

Sanjay Agrawal et al., "Database Tuning Advisor for Microsoft SQL Server 2005," Proceedings of the 30th International Conference on Very Large Data Bases, VLDB 2004, Aug.-Sep. 2004, pp. 1110-1121.

Sanjay Agrawal et al., "Integrating Vertical and Horizontal Partitioning into Automated Physical Database Design," Proceedings of the 2004 International Conference on Management of Data, SIGMOD 2004, Jun. 2004, pp. 359-370.

(Continued)

*Primary Examiner* — Jensen Hu
(74) *Attorney, Agent, or Firm* — Fish & Richardson P.C.

(57) ABSTRACT

Methods, systems, and computer-readable storage media for recommending a storage layout for the hybrid-store database with actions including receiving one or more data characteristics associated with data that is to be stored in the hybrid-store database, receiving one or more query characteristics associated with one or more queries that are expected to be applied to the hybrid-store database, processing the one or more data characteristics and the one or more query characteristics using a cost model to generate a plurality of costs, each cost being associated with a respective storage layout, identifying, based on the plurality of costs, a recommended storage layout, and providing the recommended storage layout for application to the hybrid-store database.

20 Claims, 5 Drawing Sheets

(56) References Cited

OTHER PUBLICATIONS

Surajit Chaudhuri et al., "An Efficient Cost-Driven Index Selection Tool for Microsoft SQL Server," Proceedings of the 23rd International Conference on Very Large Data Bases, VLDB'97, Aug. 1997, pp. 146-155.

Martin Grund et al., "HYRISE—A Main Memory Hybrid Storage Engine," Proceedings of the VLDB Endowment, vol. 4, No. 2, Nov. 2010, pp. 105-116.

Himanshu Gupta et al., "Selection of Views to Materialize in a Data Warehouse," IEEE Transaction on Knowledge and Data Engineering, vol. 17, No. 1, Jan. 2005, pp. 24-43.

Christian Lemke et al, "Speeding Up Queries in Column Stores: A Case for Compression," Proceedings of the 12th International Conference on Data Warehousing and Knowledge Discovery, DaWaK 2010, Aug.-Sep. 2010, Lecture Notes in Computer Science 6263, pp. 117-129.

Hasso Plattner, et al., "A Common Database Approach for OLTP and OLAP Using an In-Memory Column Database," Proceedings of the International Conference on Management of Data, SIGMOD'09, Jun.-Jul. 2009, 7 pages.

Vijayshankar Raman et al., "Constant-Time Query Processing," Proceeding so the 24th International Conference on Data Engineering, ICDE 2008, Apr. 2008, pp. 60-69.

Daniel C. Zilio et al., "DB2 Design Advisor: Integrated Automatic Physical Database Design," Proceedings of the 30th International Conference on Very Large Data Bases, VLDB 2004, Aug.-Sep. 2004, pp. 1087-1097.

Anastassia Ailamaki et al., "Weaving Relations for Cache Performance," Proceedings of the 27th International Conference on Very Large Data Bases, VLDB 2001, Sep. 2001, pp. 169-180.

Peter Boncz et al., "Database Architecture Optimized for the new Bottleneck: Memory Access," Proceedings of the 25th International Conference on Very Large Data Bases, VLDB'99, Sep. 1999, pp. 54-65.

Peter Boncz, et al., "MonetDB/X100: Hyper-Pipelining Query Execution," Proceedings of the 2nd Biennial Conference on Innovative Data Systems Research, CIDR 2005, Jan. 2005, pp. 225-237.

Franz Faerber et al, "SAP HANA Database—Data Management for Modern Business Applications," ACM SIGMOD Record, vol. 40, Issue 4, Dec. 2011, pp. 45-51.

Yongqiang He et al., "RCFile: A Fast and Space-efficient Data Placement Structure in MapReduce-based Warehouse Systems," Proceedings of the 27th International Conference on Data Engineering, ICDE 2011, Apr. 2011, pp. 1199-1208.

Ravishankar Ramamurthy et al., "A Case for Fractured Mirrors," Proceedings of the 28th International Conference on Very Large Databases, VLDB 2002, Aug. 2002, pp. 89-101.

* cited by examiner

STORAGE ADVISOR FOR HYBRID-STORE DATABASES

BACKGROUND

Recent studies reveal a rapid growth of data volumes in data warehouse systems. At the same time, there is an increasing need for interactively analyzing data to utilize information provided in the collected data. These factors gave rise to a revival of column-oriented databases (column stores). Column stores are optimized for data-intensive analysis queries, such as Online Analytical Processing (OLAP). On the other hand, some data stores are oriented row-wise. Such data stores are better suited in transactional scenarios, such as Online Transactional Processing (OLTP), which can include many updates and inserts of data as well as point queries. Queries provided under OLAP or OLTP benefit from different data alignments in memory. Due to the large amount of data, memory locality can be an important aspect for the overall performance of a database system.

SUMMARY

Implementations of the present disclosure include computer-implemented methods for recommending a storage layout for the hybrid-store database. In some implementations, actions include receiving one or more data characteristics associated with data that is to be stored in the hybrid-store database, receiving one or more query characteristics associated with one or more queries that are expected to be applied to the hybrid-store database, processing the one or more data characteristics and the one or more query characteristics using a cost model to generate a plurality of costs, each cost being associated with a respective storage layout, identifying, based on the plurality of costs, a recommended storage layout, and providing the recommended storage layout for application to the hybrid-store database.

In some implementations, actions further include receiving a workload, the one or more query characteristics being included in the workload.

In some implementations, the workload includes an expected workload.

In some implementations, the workload includes an actual workload.

In some implementations, at least one of the one or more data characteristics is received from a catalog associated with the hybrid-store database, the catalog being stored in computer-readable memory.

In some implementations, actions further include receiving schema data, wherein generating a plurality of costs is further based on processing the schema data.

In some implementations, at least a portion of the schema data is received from a catalog associated with the hybrid-store database, the catalog being stored in computer-readable memory.

In some implementations, the recommended storage layout includes a storage format comprising at least one of row-oriented storage and column-oriented storage.

In some implementations, the recommended storage layout includes table partitioning.

In some implementations, each cost of the plurality of costs includes an execution time.

In some implementations, each cost of the plurality of costs includes a memory requirement.

In some implementations, each cost of the plurality of costs is determined based on cost data associated with the respective storage layout.

In some implementations, the cost data includes, for each query type of a plurality of query types, a base cost and one or more adaptation factors.

In some implementations, the plurality of query types is provided in the one or more query characteristics.

In some implementations, the recommended storage layout is associated with a cost that is the lowest cost in the plurality of costs.

In some implementations, the one or more data characteristics include at least one of a number of tuples of a table, data types of attributes, and distribution information of the attributes.

In some implementations, receiving one or more data characteristics, receiving one or more query characteristics, processing the one or more data characteristics and the one or more query characteristics and identifying, based on the plurality of costs, a recommended storage layout are performed in an offline mode during an initial phase.

In some implementations, receiving one or more data characteristics, receiving one or more query characteristics, processing the one or more data characteristics and the one or more query characteristics and identifying, based on the plurality of costs, a recommended storage layout are performed in an online mode during use of the hybrid-store database.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
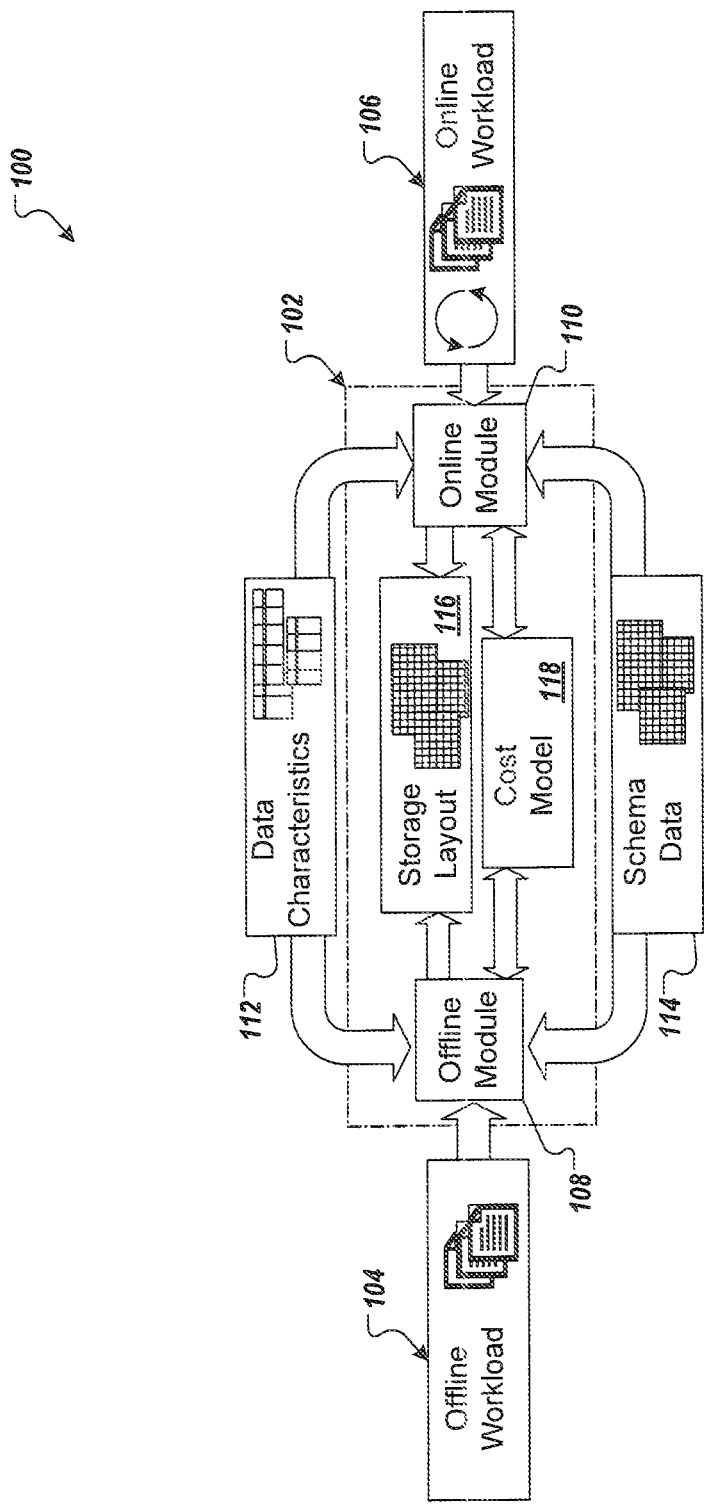
FIG. 1 schematically depicts an example storage advisor system in accordance with implementations of the present disclosure.

Implementations of the present disclosure are generally directed to advising data storage in hybrid-store databases that contain both a row store and a column store. More particularly, implementations of the present disclosure are directed to a storage advisor that provides a storage layout recommendation for storing data in a hybrid-store database. In some implementations, the storage advisor implements a cost model. In some examples, the cost model evaluates workload information and data characteristics to provide the storage layout recommendation. In some examples, workload information can include one or more queries, each query being described by respective query characteristics. In some implementations, the cost model can process multiple data characteristics and query characteristics to generate a plurality of costs. Each cost can be associated with a particular storage layout.

In some implementations, the storage advisor can automatically identify, based on the plurality of costs, an optimal storage layout. In some implementations, the storage advisor can choose the optimal storage layout for a particular workload. In some examples, the particular workload includes a set of queries, each query being described by respective query characteristics. For instance, the storage advisor can recommend storing data as row-oriented or column-oriented. In some implementations, the storage layout recommendation can also include partitioning of the data both horizontally and vertically to enable more fine-grained decisions and thus, to further optimize performance.

In some implementations, the storage advisor can directly implement the storage layout recommendation in the hybrid-store database without further input from a user. In some implementations, the storage advisor can provide the storage layout recommendation to a user, and the user can act to implement the storage layout recommendation in the hybrid-store database.

In some implementations, the hybrid-store database can be an in-memory database, which stores the data in main memory of a computing device. In this manner, real-time analytics for large amounts of data are supported. For instance, implementation of the hybrid-store database as an in-memory database does not require access to a hard disc at runtime, which enables significantly faster query processing.

As noted above, implementations of the present disclosure are directed to hybrid-store databases. Hybrid-store databases enable, for example, increased efficiency of operational business intelligence (BI) for enterprises. Generally, a user decides whether to store the data as row- or column-oriented in the hybrid-store databases. Hybrid-store databases can concurrently provide highly performing transactions and analyses. Accordingly, business users, for example, can be given a continuous real-time link between insight, foresight, and action to deliver significantly accelerated business performance, which in turn allows for better operational planning, simulation, forecasting, and ad-hoc analyses. The selection of the storage layout is not trivial and support for the database administrator is of great value. Currently, tools, optimizations, and database administrator support utilities for hybrid-store databases tend to focus on the individual parts instead of considering them jointly, without taking full advantage of their capabilities. Consequently, there is insufficient support for storage layout optimization in hybrid-store databases. As discussed herein, implementations of the storage advisor tool of the present disclosure address these issues.

FIG. 1 schematically depicts an example storage advisor system 100 in accordance with implementations of the present disclosure. In the depicted example, the system 100 includes a storage advisor 102 that receives an offline workload 104 and/or an online workload 106. In some examples, the storage advisor 102 can be provided as one or more computer-executable programs that can be executed using one or more computing devices. In the depicted example, the storage advisor 102 includes an offline module 108 and an online module 110. In some examples, the offline module 108 processes the offline workload 104 to generate a storage layout recommendation for data storage in a hybrid-store database (not shown). In some examples, the online module 110 processes the online workload 106 to generate a storage layout recommendation for data storage in the hybrid-store database. In some implementations, the offline module 108 and the online module 110 can be provided as a single module. In general, the offline module 108 and the online module 110 schematically depict the ability of the storage advisor 102 to operate in an offline mode and/or an online mode, as discussed in further detail herein.

In some implementations, data characteristics 112 and schema data 114 are also provided as input to the storage advisor 102. Example data characteristics can include the number of tuples of a table, the data types of attributes, and distribution information of the data. In some examples, at least a portion of the data characteristics 112 can be provided from a system catalog of the hybrid-store database (e.g., data types, number of tuples). In some examples, at least a portion of the data characteristics 112 can be provided from the user (e.g., during an initial phase). In some examples, the user can specify estimates of expected data volumes and distribution information in the data characteristics 112. Example schema data can include a set of available tables, a number of attributes of the tables, and relationships between tables (e.g., foreign-key relationships).

In the depicted example, the data characteristics 112 and the schema data 114 can be provided for processing in each of the offline module 108 and the online module 110. In the depicted example, each of the offline module 108 and the online module 110 provide output including a storage layout 116 and a cost model 118. As noted above, however, the offline module 108 and the online module 110 can be provided as a single module that accepts the inputs and provides the outputs as discussed herein.

Figure 2:
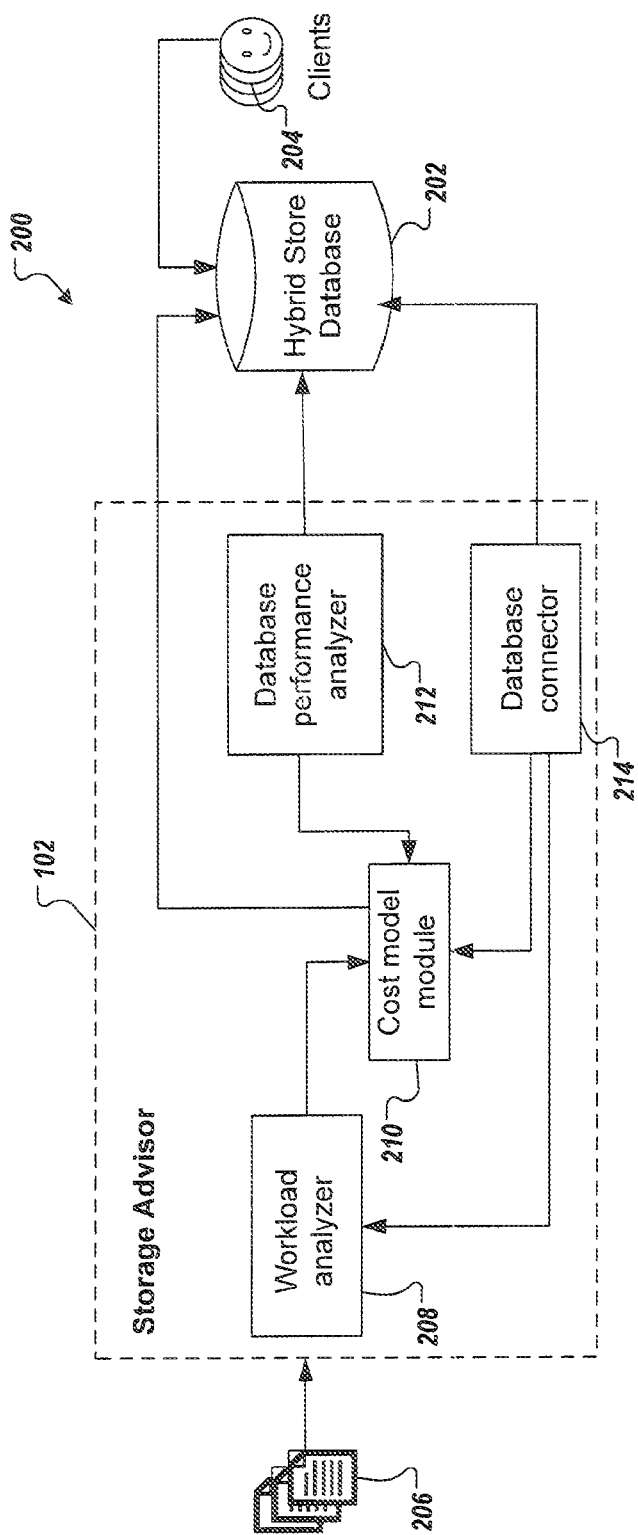
FIG. 2 depicts an example system in accordance with implementations of the present disclosure.

FIG. 2 depicts an example system 200 in accordance with implementations of the present disclosure. In the depicted example, the system 200 includes the storage advisor 102 of FIG. 1, a hybrid-store database 202, one or more clients 204 that interact with the hybrid-store database 202, and workload data 206. In the example of FIG. 2, example modules of the storage advisor 102 are depicted. The example modules include a workload analyzer module 208, a cost model module 210, a database performance analyzer module 212 and a database connector module 214. In some examples, the modules are provided as one or more computer-executable programs as part of the storage advisor 102. In some examples, one or more of the example modules can be provided as part of the offline module 108 and/or the online module 110 of FIG. 1.

In some examples, the workload analyzer module 208 receives and processes the workload data 206 and provides processed input data to the cost model module 210. In some examples, the processed input data includes an abstract workload description that can be consumed by the cost model module 210, the abstract workload description including a set of queries, each query being represented by query characteristics. In some examples, the workload data 206 includes expected workload data. In some examples, the workload analyzer module 208 receives live workload data. In some examples, the live workload data reflects actual interaction of the clients 204 with the hybrid-store database 202. In some examples, the cost model module 210 also receives schema data from the database connector module 214. In some examples, the database connector module 214 communicates with the hybrid-store database 202 and/or a database catalog associated with the hybrid-store database 202 to retrieve the schema data. In some examples, the database connector module 214 retrieves live workload data from the hybrid-store database 202. In some examples, the cost model module 210 receives cost data from the database performance analyzer module 212. In some examples, the database performance analyzer module 212 accesses the hybrid-data store 202 to determine the cost data. In some examples, the cost data includes base costs and factors, discussed in further detail herein.

In accordance with implementations of the present disclosure, the storage advisor (e.g., the storage advisor of FIGS. 1 and 2) provides a storage layout recommendation for storing data in a hybrid-store database (e.g., the hybrid-store database 202 of FIG. 2). In the offline mode, the storage advisor generates the storage layout recommendation based on an expected workload, data characteristics and schema data. In some examples, the data characteristics can include expected data characteristics. In the online mode, the storage advisor generates the storage layout recommendation based on an actual (live) workload, data characteristics and schema data. In some examples, the data characteristics include actual data characteristics. Operation of the storage advisor in each of the offline mode and the online mode is discussed in further detail below.

In the offline mode (e.g., during an initial phase), the storage advisor generates a storage layout recommendation based on expected workload data, data characteristics and schema data. In some implementations, and as discussed above, data characteristics (e.g., data types, number of tuples) and schema data (e.g., available tables, number of attributes of tables) can be retrieved from a system catalog associated with the hybrid-store database. In some implementations, a user may provide data characteristics and schema data. For example, the user can provide data characteristics by specifying estimates of expected data volumes and distribution information. In some examples, each of the workload data, the schema data and the data characteristics can be either retrieved from the system catalog or provided from the user. This can include all combinations of user and system input (e.g., the schema data being provided from the system catalog and the data characteristics and the workload data being provided from the user). In some examples, the workload data, the schema data and the data characteristics can each be provided from the system catalog (e.g., in instances where the subject database has already been used). In such instances, the data (and its characteristics), the workload information (assuming it was tracked and recorded), and the schema information are each available in the system catalog. In some examples, the workload data, the schema data and the data characteristics can each be provided from the user (e.g., in instances where the subject database is completely new and has never been used). For example, the user can provide the schema data using CREATE TABLE statements or by Entity Relationship diagrams, and the data and the query characteristics using one or more statements (e.g., SQL statements) and/or by abstract descriptions (e.g., <SUM, keyfigure1, tableA>, <INSERT, tableB>).

In the online mode (e.g., during live use of the hybrid-store database), the storage advisor generates the storage layout recommendation based on a live, or actual workload, data characteristics and schema data. In some examples, the storage advisor can evaluate the appropriateness of a currently applied storage layout (e.g., determined in the offline mode during the initial phase). If, for example, the storage advisor determines that the current storage layout is not optimal, the storage advisor can provide another storage layout recommendation.

In either the offline mode or the online mode, the storage advisor provides a storage layout recommendation for storing data in the hybrid-data store. In some examples, the storage layout recommendation is provided at the table level. For example, all tuples and attributes of a particular table can be stored in a particular format. An individual table can have different access patterns requiring different parts of a more fine-grained decision to improve performance gains. Implementations of the storage advisor can support a fine-grained decision by recommending, for example, that the tables be split (partitioned) into different parts (e.g., horizontally and vertically partition) and/or that data be stored in different stores of the hybrid-store database.

The storage layout recommendation is driven by a cost model (e.g., provided by the cost model module of FIG. 2). More particularly, and as discussed above, workload data (expected and/or live) and data characteristics are provided. In some implementations, query runtimes for different storage layouts are estimated and are compared. In some examples, and to estimate and compare query runtimes for storage layouts, the given parameters (e.g., provided in the workload and data characteristics) are integrated into the cost model. In some examples, the cost model determines a cost associated with each query type for the given workload and a given storage layout (e.g., row-store with/without table partitioning, or column-store with/without table partitioning). Example query types provided in the workload can include a SUM query, an INSERT query, an UPDATE query and a JOIN query. The costs are totaled to provide a total cost associated with each of the storage layout. In some examples, the storage layout having the lowest cost is provided as the storage layout recommendation from the storage advisor.

In some implementations, the storage advisor relies on realistic workload information and estimates the total cost using a statistics-based cost model of the incoming queries in particular database tables. In some examples, the statistics of the incoming queries can be tracked on different levels. Examples of tracking levels can include the ratio of read tuples on table level, tracking the online analytical processing (OLAP) to online transactional processing (OLTP) ratio on attribute level and tracking the fraction of returned attributes on tuple level. In some implementations, the storage advisor can use a more sophisticated cost model that can depend on the level of details being tracked of the incoming queries. In some implementations, the storage advisor can use a more sophisticated cost model based on tracking statistics implying overhead in query processing.

In further detail, and for each storage layout, a total cost is determined. In some examples, the total cost is determined as the sum of sub-costs determined for each query. For example, for a SUM query on a single table, a sub-cost can be provided as:

$$SUMQueryCost = BaseSUMCost * f_{datatype} * f_{numberOfRows} * f_{numberOfColumns} * f_{compressionRate}$$

where BaseSUMCost are the costs for a certain base setting and adaptation factors (f) are provided to adapt the base cost to a specific setting. In some examples, a base setting can include an initial setting that is used to determine a base cost, and can include default data and query characteristics. An example for default data characteristics can include a data volume of 1000 tuples, data type equal to DOUBLE, and equally distributed data. An example for default query characteristic can include 1 attribute being received. In some examples, because the actual data and query characteristics do not always conform to the default data and query characteristics, the base cost is adapted to the actual setting (specific setting) using the adaptation factors.

As another example, for an INSERT query on a single table and for an UPDATE query on a single table, respective sub-costs can be provided as:

INSERTQueryCost=BaseINSERTCost*$f_{numberOfRows}$

UPDATEQueryCost=BaseUPDATECost* $f_{numberOfAffectedRows}$*$f_{numberOfAffectedColumns}$ where BaseINSERTCost and BaseUPDATECost are the costs for a certain base setting and adaptation factors (f) are provided to adapt the base cost to a specific setting.

In some examples, and for JOIN queries, additional adaptations to the join setting can be applied. Example adaptations can include the ratio of the sizes of the tables to be joined.

In some implementations, the base costs and the adaptation factors are database specific and are determined based on database performance analyses (e.g., by the database performance analyzer module 212 of FIG. 2). In some examples, the database performance analysis is conducted offline (e.g., based on historical use of the particular database) to provide initial base costs and adaptation factors. In some examples, the base costs and the adaptation factors determined offline can be provided in the catalog associated with the subject hybrid-store database and can be looked up (e.g., during the initial phase). In some examples, database performance analysis is conducted online (e.g., after a storage layout recommendation has been implemented and the database is executed using the storage layout recommendation) to provide updated base costs and updated adaptation factors based on changes of the hardware or system settings. Example performance factors that can be used to derive the base costs and the adaptation factors can include the impact of the number of aggregated keyfigures on the runtime for different data types (e.g., DOUBLE, INT) and different stores (e.g., column-store and row-store). In some examples, performance factors for joins that consider tables in different stores (e.g., column-store and row-store) can be used to determine/update the base costs and factors.

In some implementations, sub-costs are determined for each storage layout (e.g., column-store and row-store) and the sub-costs are totaled to provide a total cost for each storage layout. In some examples, the total costs are provided in terms of query runtime. In some examples, the total costs are provided in terms of the amount of memory used. In some implementations, the storage layout associated with the lowest total cost is provided as the storage layout recommendation.

The storage advisor functionality can be implemented in multiple ways. In some implementations, the storage advisor functionality can be implemented as a tool (e.g., integrated into or on top of the hybrid-store database) that can access the database-specific costs needed for a storage layout recommendation. In this manner, the storage advisor can be provided as a knowledge-based tool that provides an independent solution to assist the user (e.g., database administrator). In some implementations, the storage advisor can be integrated into a query optimizer. In this manner, the functionality of the storage advisor can be made available via a what-if interface of the optimizer to compare the query executions costs for different stores of the hybrid-store database. In some examples, the query optimizer can be part of the database system itself and can be used as common database functionality also from other database operations.

Figure 3A:
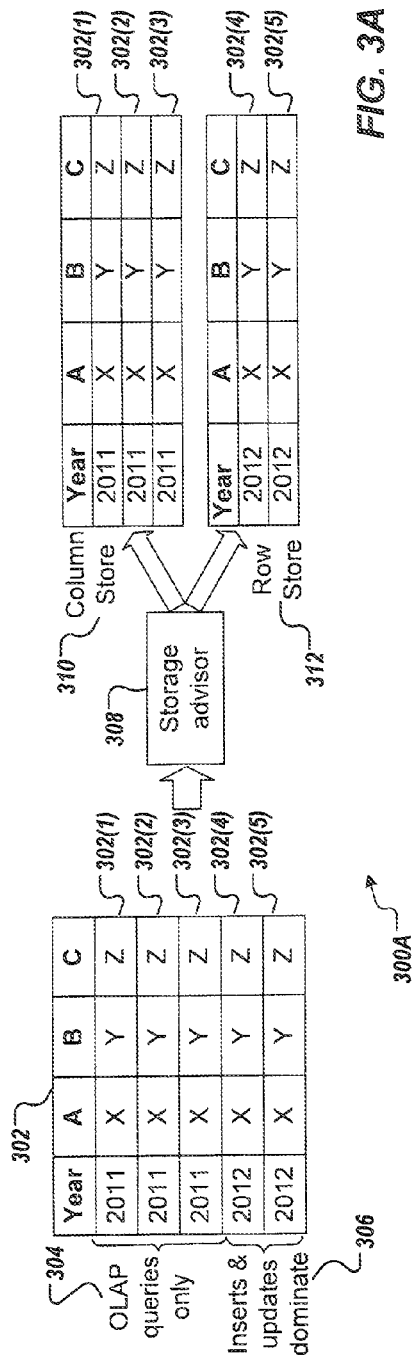
FIGS. 3A and 3B depict example partitioning of tables based on respective storage layout recommendations from a storage advisor.
Figure 3B:
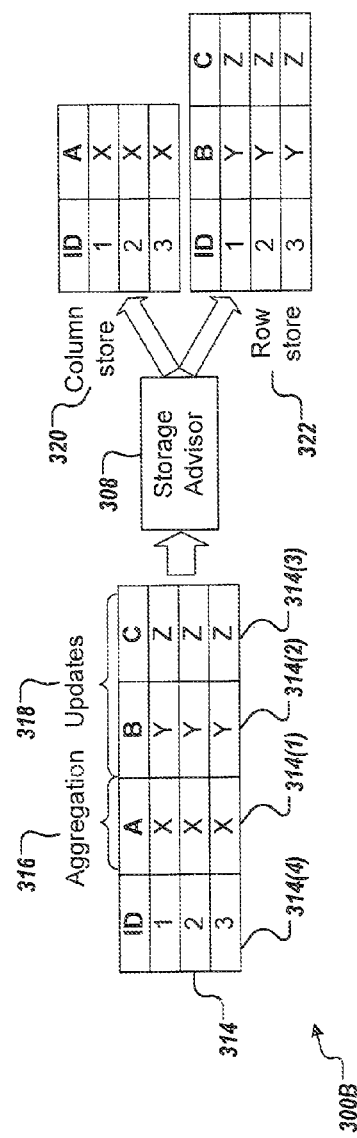

FIGS. 3A and 3B depict example partitioning of tables based on respective storage layout recommendations from a storage advisor. In particular, FIG. 3A illustrates horizontal partitioning 300A and FIG. 3B illustrates vertical partitioning 300B.

With particular reference to FIG. 3A, a table 302 is split by a storage advisor 308 into disjoint sets of rows (304 and 306). Each set of rows is defined based on query characteristics (e.g. analytical queries only 304 and frequent updates or point queries 306). Each set of rows can include one or more rows. In the illustrated example in FIG. 3A the set formed of analytical (e.g. OLAP) queries 304 includes three rows 302(1), 302(2) and 302(3) and the set formed of dominant inserts and updates includes two rows 302(4) and 302(5).

In some examples, the horizontal partitioning 300A can increase the efficiency of query processing when a subset of the (e.g. historic) tuples is used for analytical queries 304 and a subset of the (e.g. current) tuples is subject to frequent updates or point queries 306. In some implementations, analytical tuples 304 can be stored in the column-store partition 310 for fast analyses. In some implementations, current and newly arriving tuples 306 can be stored in the row-store partition 312 which enables faster inserts.

In some implementations, data can be moved from the row-store partition 312 to the column-store partition 310. In some implementations, data can be moved from the column-store partition 310 to the row-store partition 312. For queries addressing all the data of the table, a union of both partitions 310 and 312 can be executed. In some implementations, tuples that are no longer used for analysis can be stored in a row-store 312 to increase the efficiency of analytical queries on the column-store partition 310.

Referring now to FIG. 3B, a table 314 is split by the storage advisor 308 into sets of columns (or attributes) 316 and 318. In some examples, vertical partitioning 300B is not disjoint, all partitions containing the primary key attributes. In some examples, vertical partitioning 300B can be performed when a subset of the attributes is mainly subject to analytical queries (like prices or quantities) 316 and a subset of attributes 318 are often modified (like status on shipment or payment). Each subset of attributes may include one or more columns. In the illustrated example in FIG. 3B, the subset formed of analytical queries 316 includes columns 314(1), 314(4) and the subset formed of frequent updates 318 includes columns 314(2), 314(3) and 314(4).

In some implementations, aggregation attributes 316 are stored according to vertical partitioning in the column store 320. In some implementations, frequently updated attributes 318 are managed in the row store 322. For queries addressing all the data of the table, the partitions can be joined.

In some implementations, the storage advisor 308 may recommend both horizontal 300A and vertical partitioning 300B to be applied at the same time. The simultaneous recommendation of both partitioning 300A and 300B can support highly efficient inserts, updates of individual attributes, and high-performance analyses. For example, the historic tuples of a table 314 can be stored in a vertical partitioning 300B as shown in FIG. 3B, while updates on status attributes 318 may occur. Newly arriving tuples can be stored as a whole in an individual horizontal partitioning 300A as shown in FIG. 3A.

In some examples, horizontal partitioning and vertical partitioning can be combined. As one example, vertical partitioning can be used to store existing tuples and, for newly arriving tuples, a separate horizontal partitioning can be provided.

Figure 4:
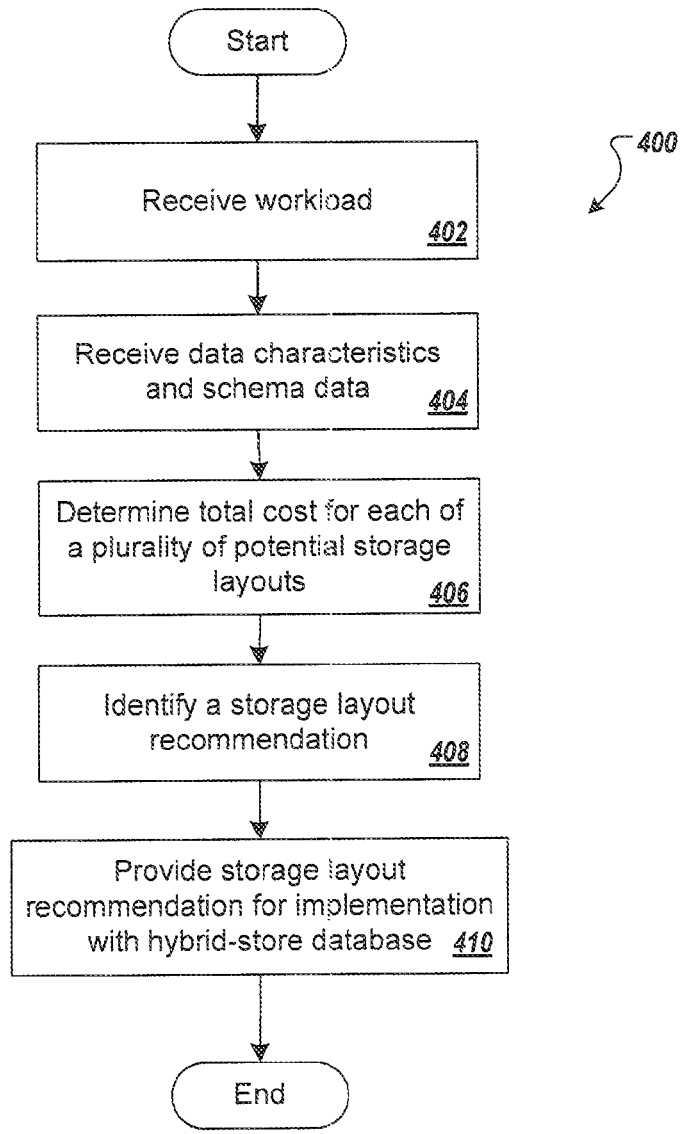
FIG. 4 depicts an example process that can be executed in implementations of the present disclosure.

FIG. 4 depicts an example process 400 that can be executed in implementations of the present disclosure. In some implementations, the example process 400 can be realized using one or more computer-executable programs that are executed using one or more computing devices.

A workload is received (402). For example, a storage advisor (e.g., the storage advisor 102 of FIGS. 1 and 2) receives the workload. In some examples, the workload includes an expected workload. In some examples, the workload includes an actual workload. Data characteristics and schema data are received (404). For example, the storage advisor (e.g., the storage advisor 102 of FIGS. 1 and 2) receives the data characteristics and the schema data. In some examples, data characteristics and/or schema data are provided from a catalog associated with a subject hybrid-store database. In some examples, data characteristics and/or schema data are provided by a user (e.g., an administrator of the hybrid-store database).

A total cost is determined for each potential storage layout of a plurality of potential storage layouts (406). For example, the storage advisor can process a cost model based on cost data (e.g., base costs and adjustment factors) associated with the respective potential storage layout. A storage layout recommendation is identified from the plurality of potential storage layouts (408). For example, the storage advisor can identify a potential storage layout from the plurality of potential storage layouts as the storage layout recommendation based on the respective total scores. The storage layout recommendation is provided for implementation with the hybrid-store database (410). In some examples, the storage layout recommendation is provided to the user for selective adoption of the storage layout recommendation by the user (e.g., the user provides explicit user input to trigger implementation of the storage layout recommendation with the hybrid-store database). In some examples, the storage layout recommendation is directly implemented with the hybrid-data store without requiring further user input.

Figure 5:
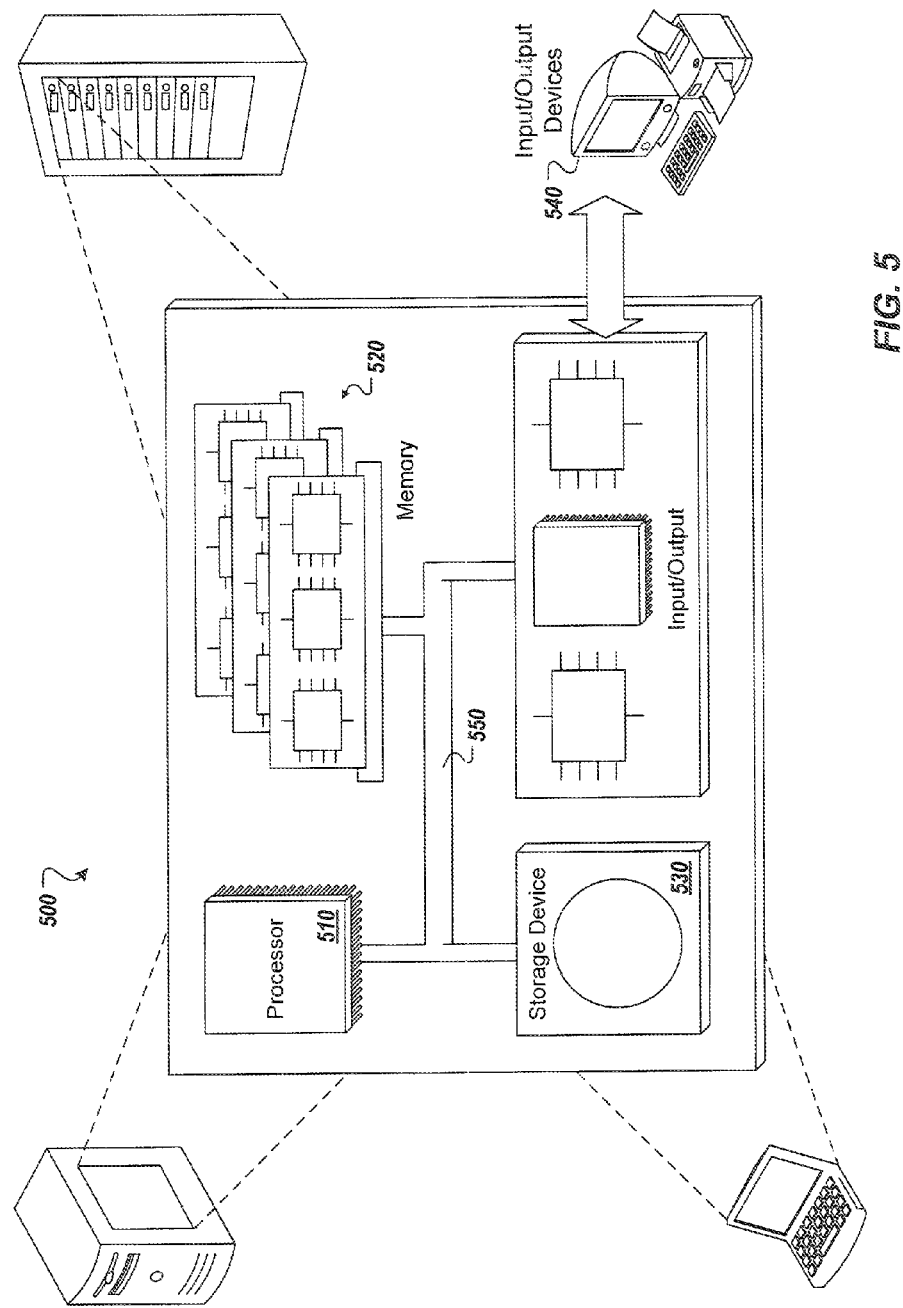
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor receives instructions and data from a read-only memory or a random access memory or both. The essential elements of a computer are a processor for executing instructions and one or more memories for storing instructions and data. Generally, a computer also includes, or is operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-P ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for recommending a storage layout for a hybrid-store database, the method being executed using one or more processors and comprising:
  receiving, by the one or more processors, one or more data characteristics associated with data that is to be stored in the hybrid-store database before the data is stored in the hybrid-store database;
  receiving, by the one or more processors, one or more query characteristics associated with one or more queries that are expected to be applied to the hybrid-store database;
  processing, by the one or more processors, the one or more data characteristics and the one or more query characteristics using a cost model to generate a plurality of storage costs based on a level of details of the one or more query characteristics, each storage cost being associated with a respective storage layout and being determined as a sum of a base cost and one or more adaptation factors, the base cost being associated with default data and default query characteristics and each of the one or more adaptation factors corresponding to a storage sub-cost determined for each of the one or more queries;
  identifying, based on the plurality of storage costs, a recommended storage layout; and
  providing the recommended storage layout for application to the hybrid-store database.

2. The method of claim 1, further comprising receiving a workload, the one or more query characteristics being included in the workload.

3. The method of claim 2, wherein the workload comprises an expected workload.

4. The method of claim 2, wherein the workload comprises an actual workload.

5. The method of claim 1, wherein at least one of the one or more data characteristics is received from a catalog associated with the hybrid-store database, the catalog being stored in computer-readable memory.

6. The method of claim 1, further comprising receiving schema data wherein generating the plurality of storage costs is further based on processing the schema data.

7. The method of claim 6, wherein at least a portion of the schema data is received from a catalog associated with the hybrid-store database, the catalog being stored in computer-readable memory.

8. The method of claim 1, wherein the recommended storage layout comprises a storage format comprising at least one of row-oriented storage and column-oriented storage.

9. The method of claim 1, wherein the recommended storage layout comprises table partitioning.

10. The method of claim 1, wherein each storage cost of the plurality of storage costs comprises an execution time.

11. The method of claim 1, wherein each storage cost of the plurality of storage costs comprises a memory requirement.

12. The method of claim 1, wherein each storage cost of the plurality of storage costs is determined based on cost data associated with the respective storage layout.

13. The method of claim 1, wherein the base cost and the one or more adaptation factors are determined offline based on a catalogue of the storage layout for the hybrid-store database.

14. The method of claim 13, wherein the plurality of query types is provided in the one or more query characteristics.

15. The method of claim 1, the recommended storage layout is associated with a cost that is the lowest cost in the plurality of storage costs.

16. The method of claim 1, wherein the one or more data characteristics comprise at least one of a number of tuples of a table, data types of attributes, and distribution information of the attributes.

17. The method of claim 1, wherein receiving one or more data characteristics, receiving one or more query characteristics, processing the one or more data characteristics and the one or more query characteristics and identifying, based on the plurality of storage costs, a recommended storage layout are performed in an offline mode during an initial phase.

18. The method of claim 1, wherein receiving one or more data characteristics, receiving one or more query characteristics, processing the one or more data characteristics and the one or more query characteristics and identifying, based on the plurality of storage costs, a recommended storage layout are performed in an online mode during use of the hybrid-store database.

19. A non-transitory computer-readable storage medium coupled to one or more processors and having instructions stored thereon which, when executed by the one or more processors, cause the one or more processors to perform operations for recommending a storage layout for a hybrid-store database, the operations comprising:
  receiving one or more data characteristics associated with data that is to be stored in the hybrid-store database before the data is stored in the hybrid-store database;
  receiving one or more query characteristics associated with one or more queries that are expected to be applied to the hybrid-store database;
  processing the one or more data characteristics and the one or more query characteristics using a cost model to generate a plurality of storage costs based on a level of details of the one or more query characteristics, each storage cost being associated with a respective storage layout and being determined as a sum of a base cost and one or more adaptation factors, the base cost being associated with default data and default query characteristics and each of the one or more adaptation factors corresponding to a storage sub-cost determined for each of the one or more queries;
  identifying, based on the plurality of storage costs, a recommended storage layout; and
  providing the recommended storage layout for application to the hybrid-store database.

20. A system, comprising:
  a computing device;
  a hybrid-store database; and
  a computer-readable storage device coupled to the computing device and having instructions stored thereon which, when executed by the computing device, cause the computing device to perform operations for recommending a storage layout for the hybrid-store database, the operations comprising:

receiving one or more data characteristics associated with data that is to be stored in the hybrid-store database before the data is stored in the hybrid-store database;

receiving one or more query characteristics associated with one or more queries that are expected to be applied to the hybrid-store database;

processing the one or more data characteristics and the one or more query characteristics using a cost model to generate a plurality of storage costs based on a level of details of the one or more query characteristics, each storage cost being associated with a respective storage layout and being determined as a sum of a base cost and one or more adaptation factors, the base cost being associated with default data and default query characteristics and each of the one or more adaptation factors corresponding to a storage sub-cost determined for each of the one or more queries;

identifying, based on the plurality of storage costs, a recommended storage layout; and providing the recommended storage layout for application to the hybrid-store database.

\* \* \* \* \*